US009623521B2

(12) United States Patent
Neelagantan et al.

(10) Patent No.: US 9,623,521 B2
(45) Date of Patent: Apr. 18, 2017

(54) INTEGRATED CENTER FRAME FOR A REFRIGERATED DISPLAY CASE

(71) Applicant: Heatcraft Refrigeration Products LLC, Richardson, TX (US)

(72) Inventors: Chera Selvan Neelagantan, Columbus, GA (US); Charles Samuel, Chennai (IN); Michael Smith, Columbus, GA (US)

(73) Assignee: Heatcraft Refrigeration Products LLC, Richardson, TX (US)

( * ) Notice: Subject to any disclaimer, the term of this patent is extended or adjusted under 35 U.S.C. 154(b) by 0 days.

(21) Appl. No.: 14/548,387

(22) Filed: Nov. 20, 2014

(65) Prior Publication Data

US 2015/0157143 A1   Jun. 11, 2015

Related U.S. Application Data

(60) Provisional application No. 61/913,474, filed on Dec. 9, 2013.

(51) Int. Cl.
*A47F 3/04* (2006.01)
*B23P 19/00* (2006.01)

(52) U.S. Cl.
CPC ............ *B23P 19/00* (2013.01); *A47F 3/0482* (2013.01); *Y10T 29/49826* (2015.01)

(58) Field of Classification Search
CPC .... A47F 3/0404; A47F 3/0426; A47F 3/0439; A47F 3/0482; F25D 23/067; B23P 19/00

USPC .......................................... 312/116, 401, 406
See application file for complete search history.

(56) References Cited

U.S. PATENT DOCUMENTS

| | | | | |
|---|---|---|---|---|
| 2,554,610 A | * | 5/1951 | Benson | A47F 3/0482 277/641 |
| 3,730,603 A | * | 5/1973 | Looms | A01G 5/06 312/116 |
| 4,805,293 A | * | 2/1989 | Buchser | F25D 23/064 264/46.6 |
| 5,517,826 A | * | 5/1996 | Duffy | A47F 3/0443 312/116 |
| 5,551,774 A | * | 9/1996 | Campbell | A47F 3/0439 312/114 |
| 5,626,028 A | * | 5/1997 | Graat | A47F 3/0456 186/44 |
| 9,101,208 B2 | * | 8/2015 | LaMontagne | A47B 3/04 |
| 2009/0188275 A1 | * | 7/2009 | Lintker | A47F 3/0439 62/446 |

* cited by examiner

*Primary Examiner* — James O Hansen
(74) *Attorney, Agent, or Firm* — Hubbard Johnston, PLLC

(57) ABSTRACT

The present application provides a refrigerated display case. The refrigerated display case includes a number of tubs, a pair of end frames positioned about the tubs, and an integrated center end frame positioned between a pair of the tubs. The integrated center end frame may include a composite material retainer member and a composite material support base.

14 Claims, 6 Drawing Sheets

INTEGRATED CENTER FRAME FOR A REFRIGERATED DISPLAY CASE

RELATED APPLICATIONS

The present application is a non-provisional application claiming priority to U.S. Provisional Application Ser. No. 61/913,474, filed on Dec. 9, 2013. U.S. Provisional Application Ser. No. 61/913,474 is incorporated herein by reference in full.

TECHNICAL FIELD

The present application and the resultant patent relate generally to modular refrigeration systems and more particularly relate to a refrigerated display case and the like with an integrated center end frame made from a composite material for a reduction in overall parts and costs.

BACKGROUND OF THE INVENTION

The modern supermarket may have any number of refrigerated display cases to store and display different types of frozen and refrigerated products. Many different types of refrigerated display cases may be used, including multi-deck coolers, reach-in coolers, and the like. The refrigerated display cases generally are modular in nature such that any number of individual units may be combined to create a display case of any suitable length. Although the components of a refrigerated display case may be substantially modular in nature, the installation of such a refrigerated display case may involve a considerable amount of on-site labor to install the refrigeration components such as the associated evaporator coils, plumbing, fans, and controls as well as shelves, lighting, and the like.

There is thus a desire for an improved refrigerated display case and a method of installing the same. The installation of such an improved refrigerated display case may be simplified through the use of fewer parts and overall lighter parts in a dedicated construction.

SUMMARY OF THE INVENTION

The present application and the resultant patent thus provide a refrigerated display case. The refrigerated display case includes a pair of tubs, a pair of end frames positioned about the tubs, and an integrated center end frame positioned between the tubs. The integrated center end frame may include a composite material retainer member and a composite material support base.

The present application and the resultant patent further provide a method of assembling a refrigerated display case. The method may include the steps of positioning a number of tubs in a tub assembly, positioning a pair of end frames about the tub assembly, positioning an integrated, composite material center end frame about the tub assembly, flowing a polyurethane foam through a number of holes in the integrated, composite material center end frame, and positioning a liner on a side projection of the integrated, composite material center end frame.

The present application and the resultant patent further provide a refrigerated display case. The refrigerated display case may include one or more tubs in a tub assembly, a pair of end frames positioned about the tub assembly, and an integrated center end frame positioned about the tub assembly. The integrated center end frame may include a composite material retainer member and a composite material support base with a center brace support.

These and other features and improvements of the present application and the resultant patent will become apparent to one of ordinary skill in the art upon review of the following detailed description when taken in conjunction with the several drawings and the appended claims.

DETAILED DESCRIPTION

Figure 1A:
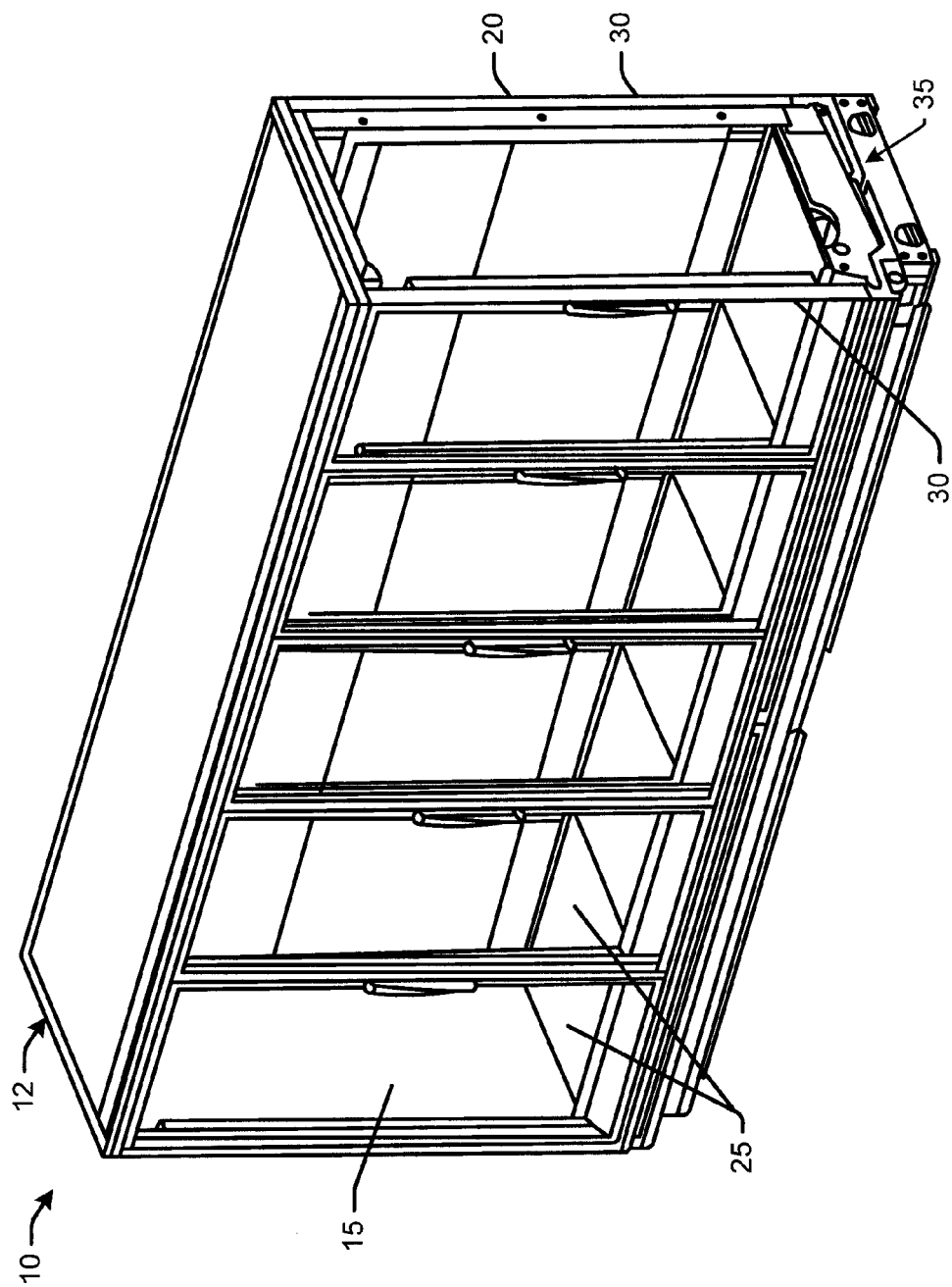
FIG. 1A is a perspective view of a portion of a known refrigerated display case in the form of a reach-in cooler.
Figure 1B:
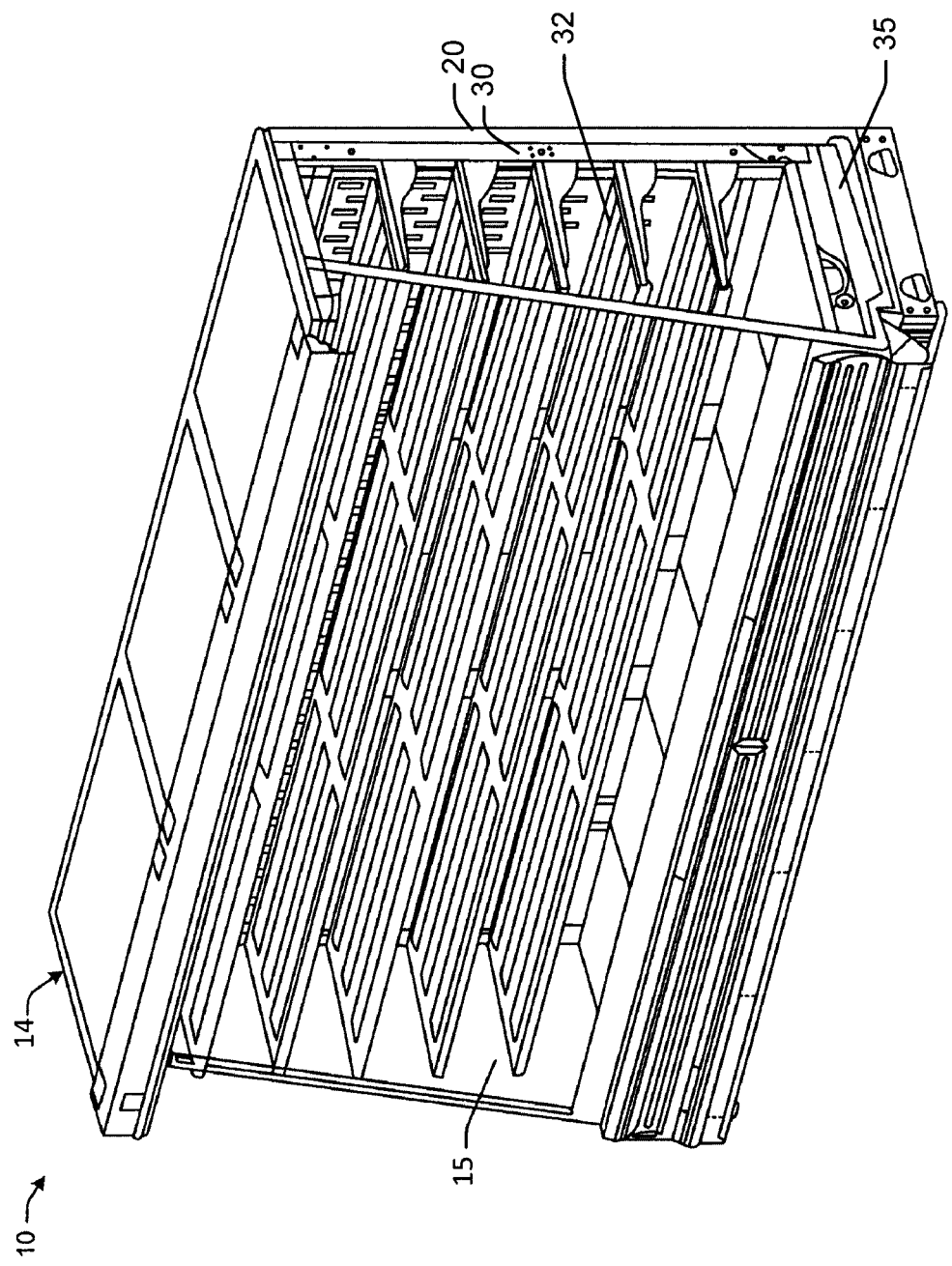
FIG. 1B is a perspective view of a portion of a known refrigerated display case in the form of a multi-deck cooler.

Referring now to the drawings, in which like numerals refer to like elements throughout the several views, FIG. 1A shows an example of a refrigerated display case 10 in the form of reach-in cooler 12. FIG. 1B shows an example of the refrigerated display case 10 in the form of a multi-deck cooler 14. In both examples, the refrigerated display case 10 may be substantially modular and may extend to any suitable length. The refrigerated display case 10 may define a refrigerated space 15. Any type or number of refrigerated or frozen products may be positioned within the refrigerated space 15. The refrigerated display case 10, and the components thereof, may have any suitable size, shape, or configuration.

Generally described, the refrigerated display case 10 may include an aft wall 20. The aft wall 20 may include a number of insulated panels and may define an air plenum therethrough for a flow of refrigerated air. The aft wall 20 may have any suitable size, shape, or configuration. In the case of the reach-in cooler 12, the refrigerated display case 10 also may include a number of door panels 25. The door panels 25 may have any suitable size, shape, or configuration. The door panels 25 may be transparent in whole or in part. In the case of the multi-deck cooler 14, the multi-deck cooler 14 is largely open to the consumer. The aft wall 20, the door panels 25, and other components herein may be supported by a number of shelf standards 30. The shelf standards 30 generally may be made out of a rigid metal or any type of substantially rigid, load bearing material. The shelf standards 30 also may support a number of shelves 32 thereon. The shelves 32 may have any size, shape, or configuration. Other components and other configurations also may be used herein.

Figure 2:
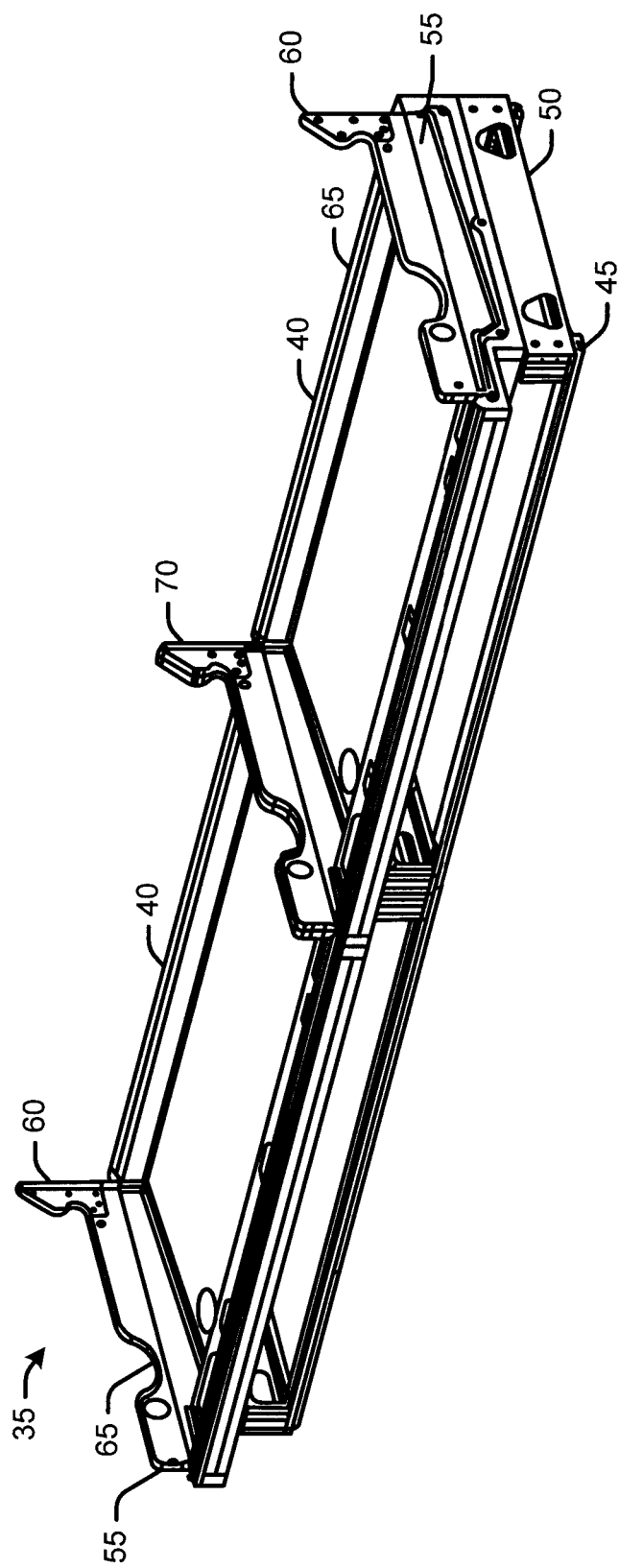
FIG. 2 is a perspective view of a tub assembly of the refrigerated display case of FIGS. 1A and/or 1B.

The refrigerated display case 10 also may include a tub assembly 35. As is shown in FIG. 2, each tub assembly 35 may include one or more tubs 40. In this example, two (2) tubs 40 are shown. Generally described, either two four foot tubs 40 may be used to form an eight foot tub assembly 35 or two six foot tubs 40 may be used to form a twelve foot tub assembly 35. Other sizes and dimensions may be used herein. The tub assembly 35 may be supported by a number of skid rails 45 and base legs 50. The tub assembly 35, and the components thereof, may have any suitable size, shape, or configuration. The refrigeration components and the like may be positioned within each of the tubs 40 of the tub assembly 35. Other components and other configurations may be used herein.

The tub assembly 35 also may provide structural support for the refrigerated display case 10 as a whole. Specifically, a pair of end frames 55 may be positioned on the outer edges of the tub assembly 35. Each of the end frames 55 may include a rear bracket support 60 for accommodating one of the shelf standards 30. Each of the end frames 55 also may include one or more pass-throughs 65 for the plumbing and/or electrical connections. The end frames 55 are generally made out of a rigid metal or other types of substantially rigid materials but may be made out of any type of substantially rigid, load bearing material. Other configurations of the end frames 55 may be known. Other types of support structures may be known.

Figure 3:
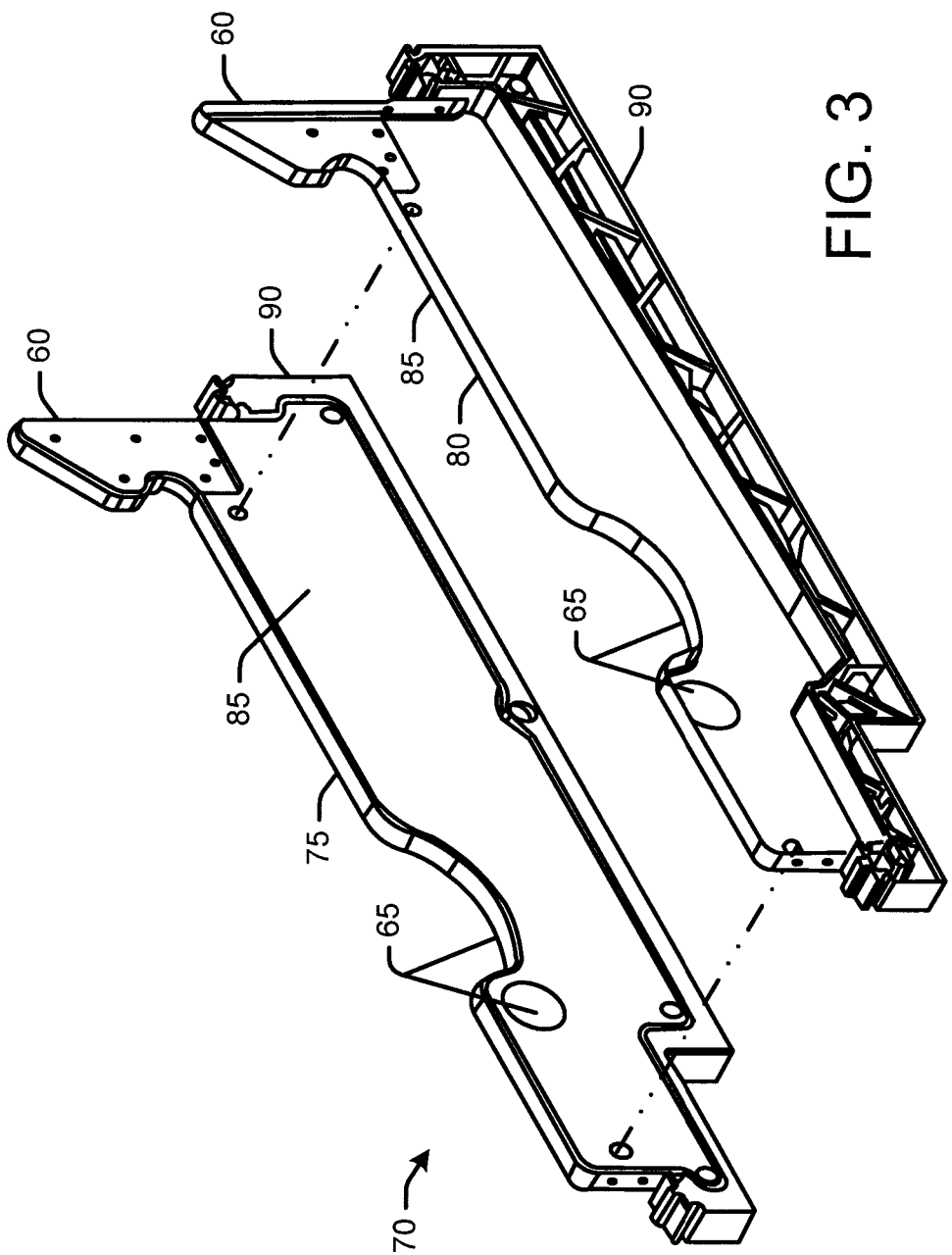
FIG. 3 is an exploded perspective view of two center end frames as used in the tub assembly of FIG. 2.

The tub assembly 35 also may include one or more center end frames 70. As is shown in FIG. 3, each tub 40 may have a center end frame 70 such that a first center end frame 75 and a second center end frame 80 are shown joined together given the use of two tubs 40. In this example, each center end frame 70 may include a metal support base 85 that extends towards the bracket support 60. The metal support base 85 may be positioned about a retainer member 90. The retainer member 90 may be made from a metal, a composite material, and the like. Other configurations of the center end frame 70 may be known.

Figure 4:
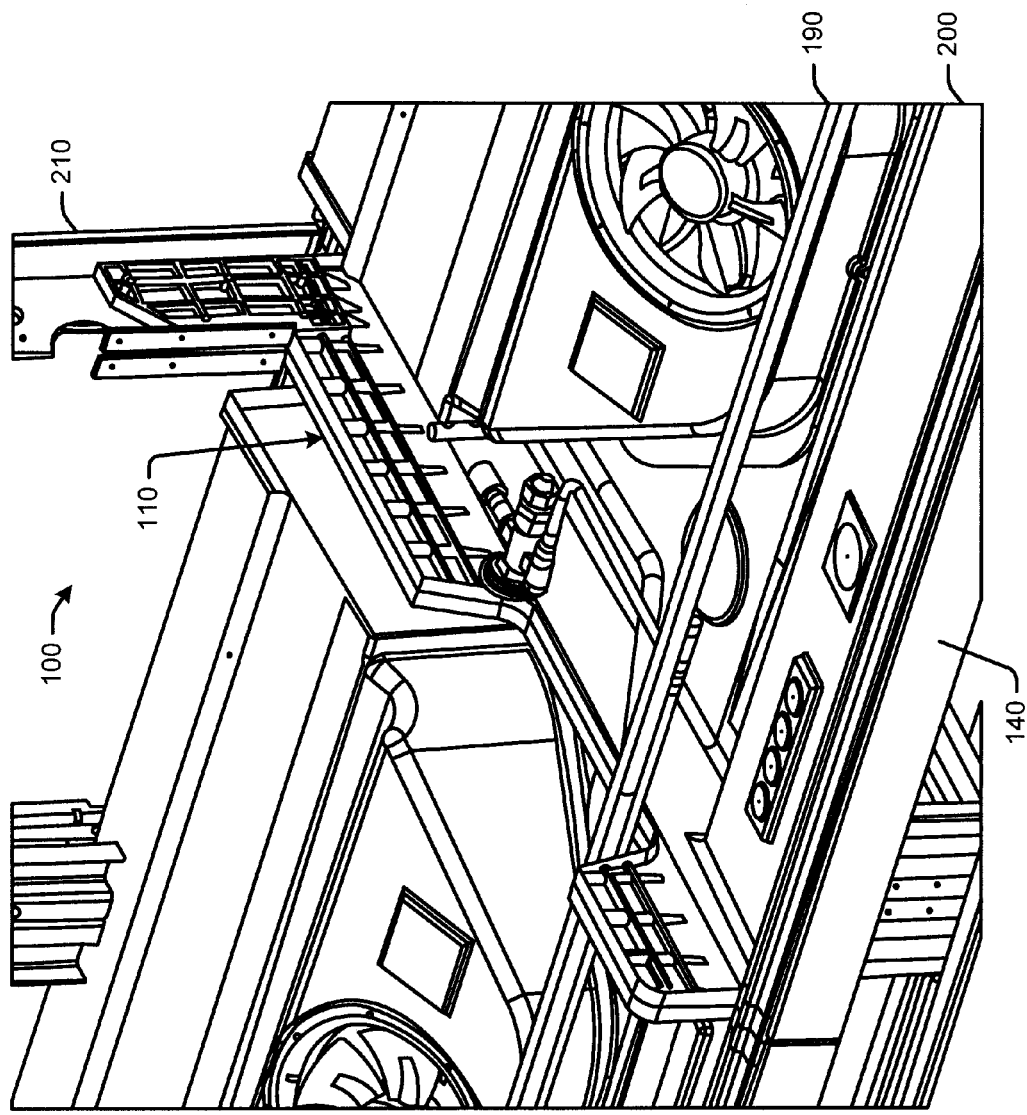
FIG. 4 is a perspective view of a portion of a refrigerated display case with an integrated center end frame as may be described herein.

FIG. 4 shows an example of a portion of a refrigerated display case 100 as may be described herein. In this example, the refrigerated display case 100 may include an integrated center end frame 110. Specifically, the refrigerated display case 100 may use a single integrated center end frame 110 instead of the pair of center end frames 75, 80 described above. The integrated center end frame 110 may have any suitable size, shape, or configuration. The integrated center end frame 110 may be made from a composite material 120. The composite material 120 may include a polypropylene and the like. Any type of substantially rigid, load bearing composite materials may be used herein. The use of the substantially rigid composite materials may result in an overall reduced weight. The integrated center end frame 110 may be formed in an injection molding process and the like so at to create the integrated construction. Three dimensional printing also may be used herein. Other types of manufacturing techniques may be used.

Figure 5:
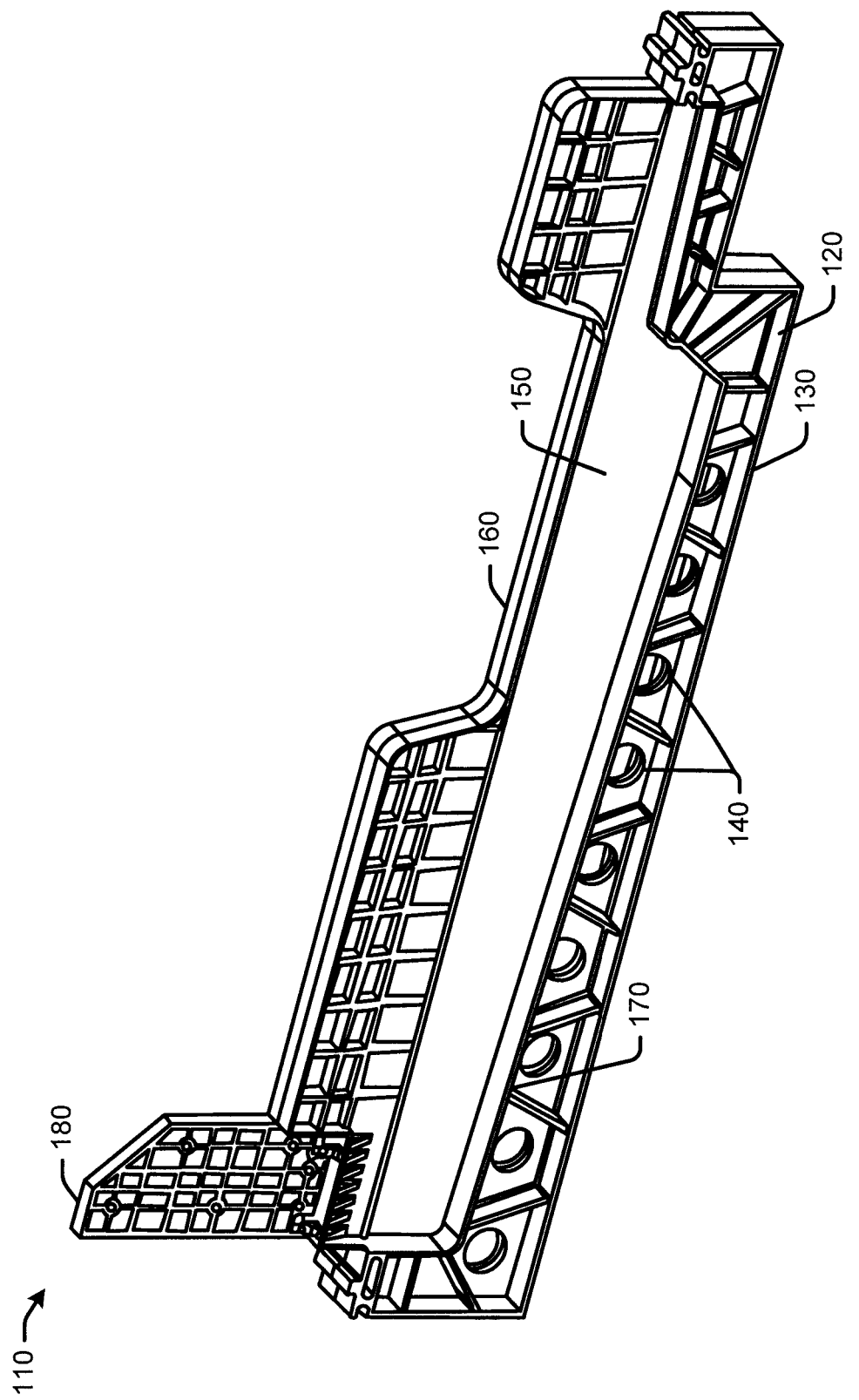
FIG. 5 is a further perspective view of the integrated center end frame of FIG. 4.

As is shown in FIG. 5, the integrated center end frame 110 may include a retainer member 130. The retainer member 130 may have a number of retainer holes 140 therein. The retainer holes 140 may have any suitable size, shape, or configuration. The retainer holes 140 may allow for a polyurethane foam and the like to flow from one tub 40 to the next for better integration of the overall refrigerated display case 100 during construction. The center end frame 110 may have an integrated support base 150 positioned on the retainer member 130. The support base 150 may include a substantially wide pass-through 160. The pass-through 160 may have any suitable size, shape, or configuration and may be suitable for any number or diameter of conduits 190 to pass therethough. The conduits 190 may support the plumbing and/or electrical components and the like. The support base 150 also may include a side projection 170. The side projection 170 may have any suitable size, shape, or configuration. The side projection 170 may minimize any sort of gap between a liner 200 and a frame 210 of the tub assembly 35. The integral center end frame 110 also may include an extended center brace support 180 extending from the support base 150. The center brace support 180 may support one of the shelf standards 30. The center brace support 180 may have any suitable size, shape, or configuration. Integrated center end frames 110 of differing sizes may be manufactured for varying types and sizes of refrigerated display cases 100. Other components and other configurations may be used herein.

Referring again to FIG. 4, the integrated center end frame 110 may be positioned between a pair of tubs 40 in the tub assembly 35. A number of the conduits 190 may extend through the pass-through 160. The larger size of the pass-through 160 permits simplified assembly including on-site brazing of the conduits 190 and the like as may be required. The liner 200 may be positioned against the side projection 170 so as to reduce leakage of condensate and the like.

Structural analysis of known refrigerated display cases 10 as a whole revealed that most of the weight of the aft wall 20 and other types of vertical components may be borne by the end frames 55 as opposed to the existing center end frame 70. As a result, the integrated center end frame 110 described herein may be made from the composite material 120 instead of a metal and like. Moreover, the integrated center end frame 110 may be a single element as opposed to the pair of frames 75, 80 previously used.

Once installed about a pair of tubs 40, polyurethane foam and the like may flow through the retainer holes 140 so as to provide overall better integration while the large pass-through 160 provides for ease of installation. The use of the integrated center end frame 110 in the refrigerated display case 100 thus provides a reduction in part count and metal and thus provides a significant cost savings. Moreover, the side projections 170 may limit leakage of any condensate therethrough without the use of caulking. The integrated center end frame 110 may be used for a refrigerated display case 100 of any desired length.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A refrigerated display case for displaying refrigerated items, the refrigerated display case having a lateral dimension extending horizontally lengthwise along a front of the display case, a transverse dimension extending horizontally and perpendicular to the lateral dimension, and a vertical dimension orthogonal to both the lateral and transverse dimension, the refrigerated display case comprising:

a tub assembly having outer edges, the tub assembly comprising a pair of tubs;

a pair of end frames positioned on the outer edges of the tub assembly and supporting the pair of tubs;

shelf standards coupled to the pair of end frames for supporting a plurality of shelves, the shelves for supporting the refrigerated items;

an integrated center end frame positioned between and supporting the pair of tubs;

the integrated center end frame comprising:

a composite material retainer member, the composite material retainer member formed from a composite material and extending transversely across the refrigerated display case, a composite material support base, the composite material support base formed from a composite material and extending transversely across the refrigerated display case, the composite material support base coupled to the composite material retainer member, the composite material support base positioned above the composite material retainer member with respect to the vertical dimension, the composite material support base having a vertical planar portion, and wherein the composite material support base comprises a first side projection and a second side projection thereon, each of the first side projection and the second side projection extending horizontally from and substantially perpendicular to the vertical planar portion of the composite material support base; and a liner positioned substantially on the first side projection or the second side projection.

2. The refrigerated display case of claim 1, wherein the composite material retainer member and the composite material support base comprise a polypropylene.

3. The refrigerated display case of claim 1, wherein the composite material retainer member and the composite material support base are made in an injection molding process.

4. The refrigerated display case of claim 1, wherein the composite material retainer member comprises a plurality of retainer holes therein.

5. The refrigerated display case of claim 4, further comprising a polyurethane foam in the plurality of retainer holes.

6. The refrigerated display case of claim 1, wherein the composite material support base comprises one or more pass-throughs therein sized and configured to allow conduits to pass therethrough.

7. The refrigerated display case of claim 6, further comprising one or more conduits extending through the one or more pass-throughs.

8. The refrigerated display case of claim 1, wherein the composite material support base comprises a center brace support extending therefrom in a vertical direction.

9. The refrigerated display case of claim 8, wherein the center brace support comprises a composite material center brace support.

10. The refrigerated display case of claim 8, further comprising a frame member supported by the center brace support.

11. The refrigerated display case of claim 1, wherein the pair of end frames comprises a rigid metal.

12. A refrigerated display case for presenting refrigerated items for customers, the refrigerated display case having a lateral dimension extending horizontally lengthwise along a front of the display case, a transverse dimension extending horizontally and perpendicular to the lateral dimension, and a vertical dimension orthogonal to both the lateral and transverse dimension, the refrigerated display case comprising:

one or more tubs in a tub assembly, the tub assembly having outer edges;

a pair of end frames positioned about and supporting the tub assembly, the pair of end frames positioned at the outer edges of the tub assembly;

a plurality of shelf standards coupled to the pair of end frames for holding a plurality of shelves;

an integrated center end frame positioned about and supporting the tub assembly, the integrated center end frame positioned between the pair of end frames;

the integrated center end frame comprising a composite material retainer member and a composite material support base with a center brace support;

wherein composite material retainer member extends transversely across the refrigerated display case;

wherein the composite material support base extends transversely across the refrigerated display case;

wherein the composite material support base is positioned above the composite retainer member with respect to a vertical dimension;

wherein the composite material support base comprises one or more side projections thereon, wherein each of the one or more side projections extends outward from a surface of the composite material support base and forms a surface that is orthogonal to the surface of the composite material support base; and wherein the composite material retainer member comprises a plurality of retainer holes therein; and a liner positioned substantially on the one or more side projections.

13. The refrigerated display case of claim 12, wherein the composite material support base comprises one or more pass-throughs therein.

14. The refrigerated display case of claim 12, wherein the pair of end frames comprises a rigid metal.

* * * * *